United States Patent [19]

Sanglier

[11] Patent Number: 4,685,121
[45] Date of Patent: Aug. 4, 1987

[54] CONNECTING AND COMMUNICATION SYSTEM AND MEANS FOR A TELEPHONE STATION WITH PERIPHERAL APPARATUS

[75] Inventor: Jean-François Sanglier, Flers, France

[73] Assignee: U.S. Philips Corporation, New York, N.Y.

[21] Appl. No.: 697,353

[22] Filed: Feb. 1, 1985

[30] Foreign Application Priority Data

Feb. 1, 1984 [FR] France ............................. 84 01554

[51] Int. Cl.$^4$ ........................................... H04M 11/00
[52] U.S. Cl. ..................................... 379/90; 379/165; 379/156
[58] Field of Search ................. 179/2 A, 7.1 R, 99 R, 179/99 A, 99 LS, 99 LL; 379/90, 165, 156

[56] References Cited

U.S. PATENT DOCUMENTS

| | | | |
|---|---|---|---|
| 3,937,889 | 2/1976 | Bell, III et al. | 179/2 A |
| 4,410,767 | 10/1983 | Sekiguchi | 179/99 R |
| 4,491,690 | 1/1985 | Daley | 179/2 A |
| 4,536,615 | 8/1985 | Kimijima et al. | 179/99 A X |
| 4,551,832 | 11/1985 | Carll et al. | 179/2 A |
| 4,571,455 | 2/1986 | Labock et al. | 179/2 A |

FOREIGN PATENT DOCUMENTS 0018525 4/1980 European Pat. Off. .

Primary Examiner—James L. Dwyer
Attorney, Agent, or Firm—Thomas A. Briody; Jack Oisher; William J. Streeter

[57] ABSTRACT

Connection of a plurality of peripheral apparatus (APT) and a telephone station (PT) is achieved by a bus (BUS) which transmits analog signals and digital signals which are common to all of the apparatuses. Thus, each apparatus is supplied at each instant with information indicating the actual use of the telephone line to which the telephone station is connected.

10 Claims, 6 Drawing Figures

CONNECTING AND COMMUNICATION SYSTEM AND MEANS FOR A TELEPHONE STATION WITH PERIPHERAL APPARATUS

BACKGROUND OF THE INVENTION

1. Field of the Invention

The invention relates to a peripheral telephone system, comprising a telephone station connected to a subscriber line, at least one peripheral apparatus and connecting means between said station and the peripheral apparatus(es) for executing system functions of the system.

2. Description of the Related Art

System functions to be executed by connecting means between the telephone station and the peripheral apparatuses are, for example, the transmission of speech signals and of signalling information, the conveyance of supply energy and providing an electric reference.

A system as described in the opening paragraph is disclosed in European Pat. No. 0018525. In this prior art system the connecting means between the telephone station and the peripheral apparatuses are formed by a two-wire connecting line to which the peripheral apparatuses are connected. To this end, the peripheral apparatus and also the telephone station must comprise at least one interface circuit and a processing unit.

SUMMARY OF THE INVENTION

The invention has for its object to provide a system of the type described in the opening paragraph, whose peripheral apparatuses can be of a simpler construction.

Therefore, the peripheral telephone system as described in the opening paragraph is characterized in that the connecting means are in the form of a bus comprising a plurality of conductors, each conductor being intended for only one function of the system and each function of the system being performed by one specific conductor of the bus.

The mode of operation of a bus is well known in the data processing industry; it consists in transmitting signals to a multi-line transmission channel such that each signal present on one of the lines is accurately repeated at any point of said line; thus, all the apparatuses connected to the bus receive the same information on the state of each line of the bus, that is to say of the state of the bus; obviously, for each line of the bus, each connected apparatus may be either a signal transmitter and/or a signal receiver.

The connection, according to the invention via a bus thus renders is possible to connect a plurality of peripheral apparatuses which all have at their disposal the same information transmitted via the bus; making the telephone station and the subsets connected to the bus operative, simultaneously or not simultaneously, can be effected in a carefully planned way to avoid conficting situations and/or incorrect handling which would result in a poor use of the telephone line.

To this end it is sufficient for the bus to transmit the signals which are necessary and adequate for all the uses of a telephone station with multi-wire bus.

Irrespective of the fact whether these uses are simple or complex, it must be possible to use the same bus, which implicates that it must be possible to use the same signal transmitted by a line of the bus for all the apparatuses for which this signal is of interest; the choice and the number of transmitted signals is therefore of prime importance to ensure that the bus will be independent of the usage it is put to, that is to say the bus must be as universal as possible.

To this effect the peripheral telephone system is characterized in that the telephone station comprises:

a device for connection to the telephone network, a call detector for generating a call detection signal, when a call comes from this network, a two-state energizing device, that is to say having an active and an inactive state, a two-state internal control device for controlling said energizing device, having an off-hook state for controlling the active state and an on-hook state for controlling the inactive state, a current regulating device for the current circulating in said line when the energizing device is in the active state, a 2-wire/4-wire converter of which on the one hand the input is activated by a microprocessor for sending an audio signal via said line, and on the other hand the output activates a telephone receiver or loudspeaker, by means of an audio signal received from said line, and in that said bus comprises six conductors:

a first conductor for transmitting a reference signal which is common to all the apparatuses connected to this bus;

a second conductor for transmitting, from the telephone station, a signal indicating the off-hook or the on-hook condition of said two-state internal control device, a third conductor for transmitting from the telephone station said audio signal coming from said line, a fourth conductor for transmitting from the telephone station, a signal indicating whether a call is detected or not detected, a fifth conductor for transmitting, provided by at least one peripheral apparatus, an external line seizure control signal, a sixth conductor for transmitting, coming from at least one peripheral apparatus, an analog input signal.

Thus in addition to its known functions, the telephone station functions as an interface between the telephone line and the data bus which is common to all the connected apparatuses; therefore, according to the invention, said telephone station is characterized in that it comprises connecting means for connecting itself to said bus these means bein more specifically: an OR-gate circuit whose output controls the energizing device and a first input of which is connected to said two-state internal control device and whose second input is conected to said fifth conductor of the bus for receiving an external line seizure control signal, and thus to activate the activation device depending on the origin, internal and/or external, of the line seizure control signal.

Thus the connecting system transmits a common reference signal, a signal which indicates the on-hook/off-hook condition and may be similar to a position indicator of a conventional handset when it is lifted from or placed on its cradle for starting or ending a telephone conversation; within the scope of this multi-wire bus system, the peripheral apparatus being, for example, an automatic telephone answering device, the telephone station may be in the off-hook condition, because of the presence of the answering device, even if the conventional handset is in the on-hook position; the above-mentioned OR-gate provides the advantage that it is possible to control the line seizure or, in other words, to go to the off-hook condition either under the control of the telephone station or under the control of a peripheral apparatus.

Said six-conductor bus connected to the telephone station of the type mentioned above enables more specifically the connection of a peripheral apparatus of the answer-back recording type.

So as to render the making of a call possible, the telephone station must comprise a loop-opening arrangement for opening the loop under the control of a control signal which is generally provided by a dialling circuit associated with a dial or a keyboard, which are both well known in telephone stations.

It is an advantage of the invention that it is possible to effect dialling by opening the loop under the control of a control signal transmitted by an additional conductor of the bus, which signal is supplied by a peripheral apparatus.

In that case it is sufficient when measure are taken to inhibit parasitic signals using a known muting device to attenuate the audio signals, more specifically during dialling; according to the invention it is particularly interesting to enable the control of the muting device from a peripheral apparatus and for that purpose an additional conductor is provided in the bus for transmitting this external muting control signal.

In order to provide a bus of the most general type possible, it has been found that a plurality of conductors is necessary to enable connection thereto of a greatest possible variety of peripheral apparatuses, without however increasing the number of conductors to an absurd extent; the choice of the transmitted signal is therefore an important feature of the invention which will be better understood on the basis of the description given by way of non-limitative example with reference to the accompanying drawings wherein:

DESCRIPTION OF THE PREFERRED EMBODIMENTS

Figure 1:
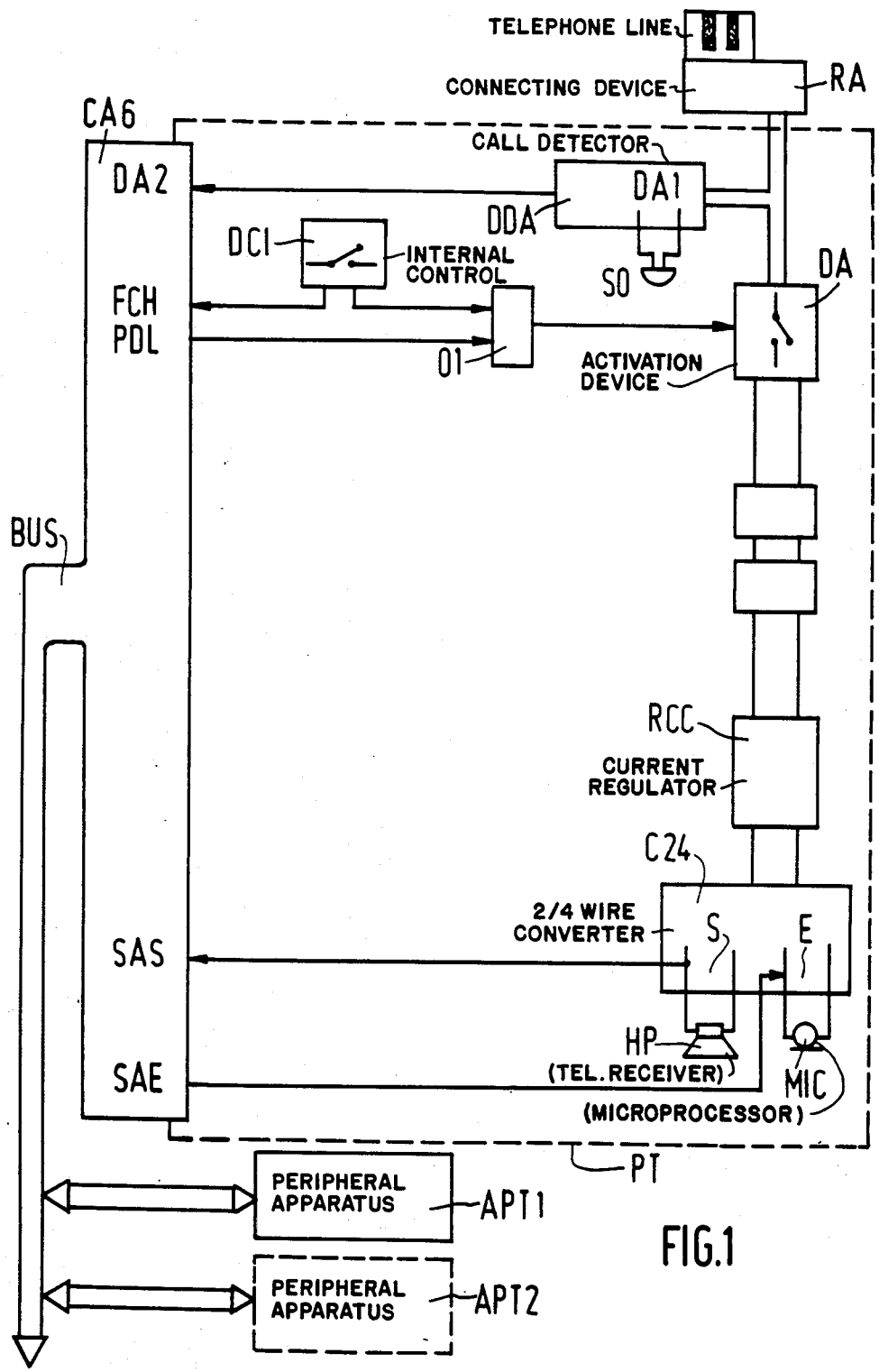
FIG. 1 illustrates the invention in very broad outline.

FIG. 1 shows schematically the peripheral apparatuses (APT1, APT2, ...) connected to the bus (BUS) to which also a telephone station (PT) is connected. The telephone station (PT) is connected to a telephone line via a connecting device (RA), for example a connector of a current model.

The telephone station shown comprises more specifically the following known devices:

a call detection device (DDA) for, if a call is coming in, generating a first call detection signal (DA1) to activate, for example, a bell (SO), a two-state activation device (DA), having an active state and an inactive state, a two-state internal control device (DCI) for controlling said activation device (DA) having an off-hook state for controlling said active state and an on-hook state for controlling said inactive state, a current regulating device (RCC) for regulating the current circulating in said line when the activation device is in the active state, a 2-wire/4-wire converter (C24) of which on the one hand the input (E) is activated by a microphone (MIC) for sending an audio signal through said telephone line and on the other hand the output (S) activates a telephone receiver (HP), or loudspeaker, with an audio signal supplied by said telephone line.

As will be obvious the telephone station thus described is a very simple station, which on its own is only capable of answering a call; it cannot effect a call as it does not have a dialling circuit. Within the scope of multi-wire buses, this type of station may be perfectly sufficient for use as a slave or a remote-controlled peripheral apparatus type.

To transmit a remote control signal to the peripheral apparatuses while maintaining adequate safety measures, for example an audible acknowledgement of the receipt of the remote control signal with on-hook/off-hook, a bus having a minimum of six conductors is provided in accordance with the invention in the telephone station, these conductors being connected as follows:

a conductor for a reference signal (REF), not shown, the reference signal may have the frame potential, but in telephony this is generally not earth potential a conductor (FCH) for transmitting from the telephone station a logic signal indicating the state, off-hook or on-hook, of said internal control device (DCI)

a conductor (SAS) for transmitting from the telephone station said audio or analog signal present at the output of the 2-wire/4-wire converter (C24)

a conductor (DA2) for transmitting from the telephone station a logic signal which indicates whether a call is detected or not detected; this logic signal is generally different, by nature, of said first call detection signal (DA1) but these two signals have the same functions and are generated by the same, above-mentioned call detection arrangement (DDA)

a conductor (PDL) for transmitting an external line seizure control signal, provided by a peripheral apparatus, a conductor (SAE) for transmitting, from by a peripheral apparatus, an analog input signal to be transmitted to the input (E) of the 2-wire/4-wire converter (C24).

To ensure the electrical connection of the telephone station to the bus, a known and symbolically-shown connector having at least 6 pins (CA6) may be used.

In the actual telephone station, the connections are effected by known means, cables or otherwise, whilst optionally known safety/and insulating means such as, for example, resistors, capacitors, ... depending on the nature, logic or analog, of the transmitted signals.

It is in particular recommendable to provide, according to the invention the telephone station with inter alia or OR-gate (01) for combining on the one hand the control signal produced by said internal control arrangement (DCI), and on the other hand the external line seizure control signal produced by the conductor (PDL) of the bus, such that the activating device (DA) is adjusted to the active state, whatever the origin of the line seizure control signal; this origin may either be internal, the off-hook condition of the said internal control arrangement, or external, the line seizure signal (PDL) then being active and coming from a peripheral apparatus.

Figure 2:
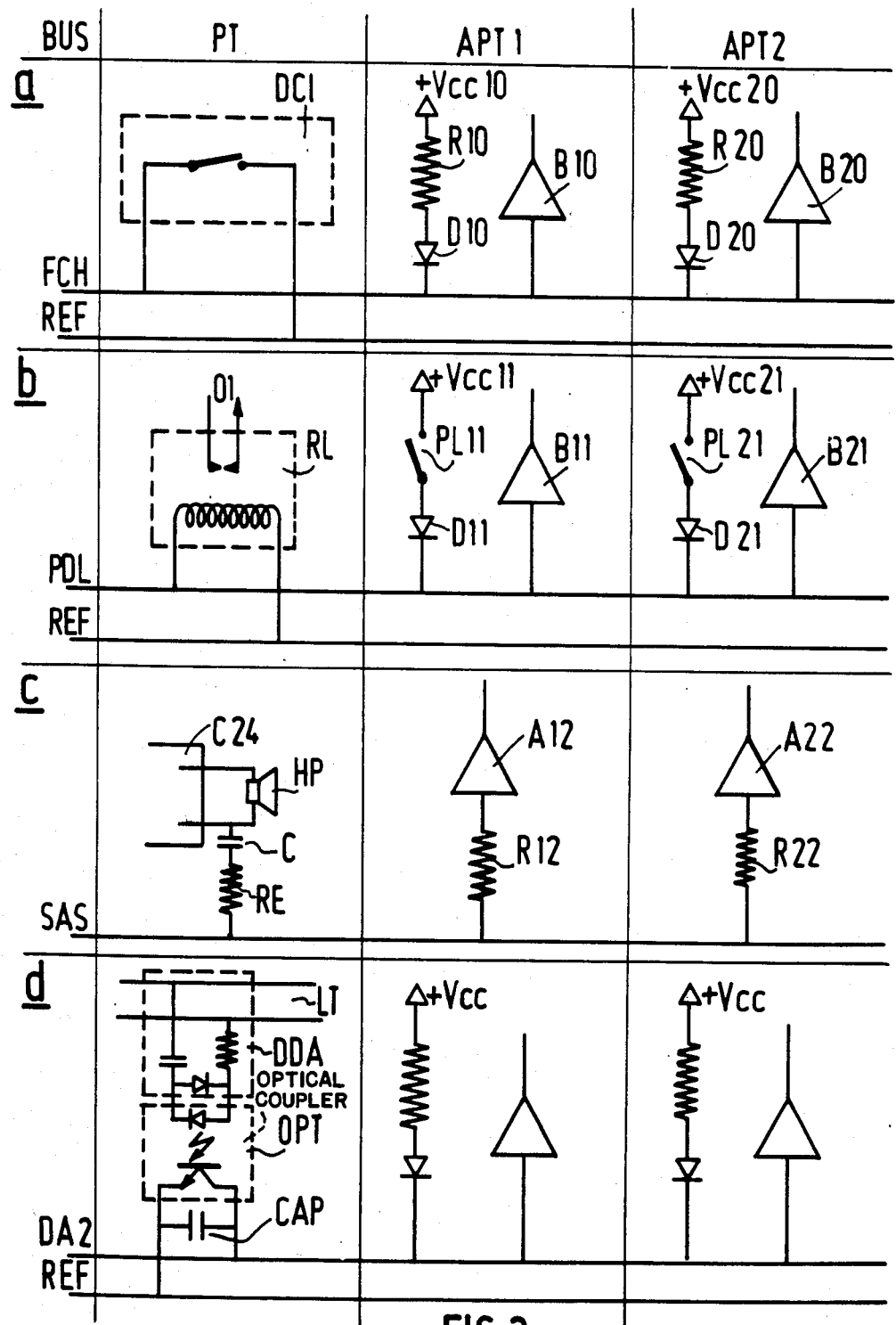
FIG. 2 shows an electrical connection mode.

By way of non-limitative example, FIG. 2 shows in the form of a Table examples of the mode of connecting the conductors of the bus (BUS) to the telephone station (PT) and to the peripheral apparatuses (APT1, APT2).

FIG. 2a illustrates a mode of connecting the conductor (FCH); the internal control arrangement (DCI) is often a simple interruptor, electrical, mechanical or otherwise which in the on-hook condition does not produce or supply any energy; to know its state, on-hook or off-hook, the power supply (VCC10) of the peripheral apparatus (APT1) is connected to the conductor (FCH) via a resistor (R10) and a diode (D10); thus, in the on-hook state, the interruptor is open and the conductor (FCH) is at the supply voltage (VCC10), whereas in the off-hook state the interruptor is closed and the conductor (FCH) is at the reference voltage (REF); thus it is sufficient to check the voltage of the conductor (FCH) with the aid of a voltage buffer (B10) to enable the subset (APT1) to determine the state of the internal control arrangement (DCI). The connection of the peripheral apparatus (APT2) is, for example, similar to the above connection, and comprises a power supply (VCC20), a resistor (R20) a diode (D20) and a voltage buffer (B20). The voltages (VCC10) and (VCC20) do not interfere with each other because of the presence of the diodes (D10) and (D20); the voltage across the conductor (FCH) in the on-hook condition will be equal to the highest of all the voltages (VCC) of the connected peripheral apparatuses.

FIG. 2b illustrates a mode of connecting the conductor (PDL); the external line seizure control signal can be generated in any peripheral apparatus, for example by means of an interrupter (PL11, PL21), which is fed with a voltage (VCC11, VCC21 which may be the same as VCC10, VCC20) and is connected to the conductor (PDL) via a diode (D11, D21) to prevent the supply voltages (VCC) from interfering with each other as described above. In the telephone station, the signal (PDL) can be connected directly to the input of the above-mentioned OR-gate (01) but, for safety reasons, preference should be given to an electric insulation, for example as shown by means of a relay (RL), arranged between the telephone station and the bus.

Voltage buffers (B11, B21) enable each peripheral apparatus to know the state of the conductor (PDL).

FIG. 2c illustrates a mode of connecting the conductor (SAS); in the interior of the telephone station a resistor (RE) and a capacitor (C) are preferably arranged between the loudspeaker (HP) and the bus, to offset any d.c. components of the analog signal provided by the 2-wire/4-wire converter as described above. The reception of the signal ina peripheral apparatus can, for example, be effected via a resistor (R12, R22) and an amplifier (A12, A22) or via any other suitable means determined by the specific function of each peripheral apparatus.

FIG. 2d illustrates a mode of connecting the conductor (DA2); the call detection arrangement (DDA) of the telephone station (PT) energizes, when there is a call on the telephone line (LT), an opto-coupler (OPT); a capacitor (CAP) is connected between the leads of the opto-coupler for filtering the current waves which are similar to the ringing waves, as mentioned above; feeding the opto-coupler and testing its state whether there is a call or not of the known intermittent ringing type, may, for example, be effected using means of the same type as those used in the above-described FIG. 2a), and those shown in FIG. 2d).

The connecting means shown by way of non-limitative example in FIG. 2 are well known to persons skilled in the electronic and/or telephone art, who will no doubt note that the invention is mainly based on the bus principle, which bus advantageously replaces the above-mentioned prior art multiple distribution contacts, and of the choice of the signals transmitted through the conductors of the bus.

Using the bus having a minimum of six conductors as mentioned in the foregoing, it is possible to connect, for example, peripheral apparatuses for remote control or remote supervision applications as described in the above-cited French periodical.

Obviously, for more complicated applications, it is necessary to "enrich" the bus with an additional conductor or additional conductors to enable the transmission of further signals.

Figure 3:
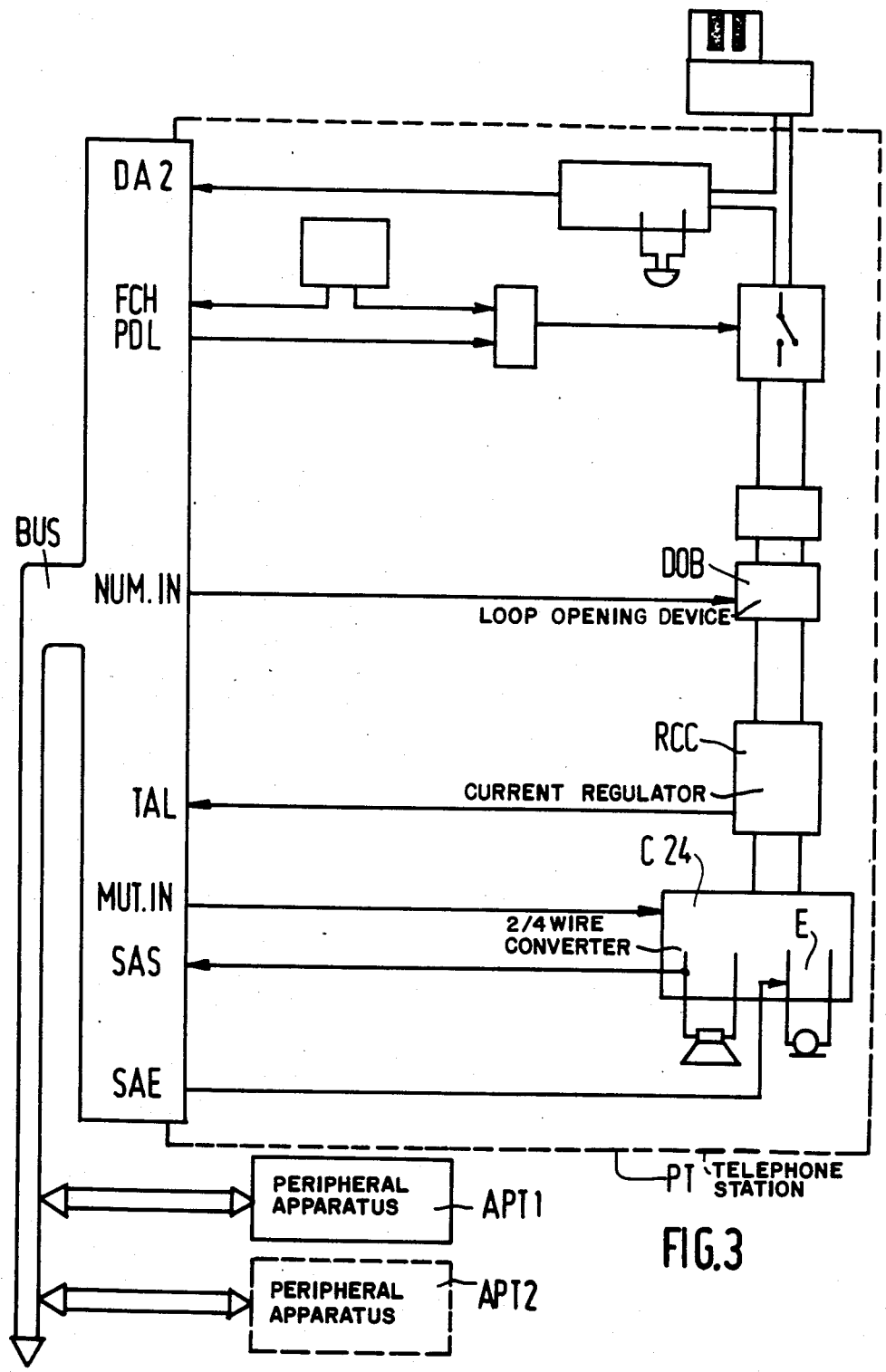
FIG. 3 illustrates one version of the invention.

According to the invention, an additional conductor (TAL), FIG. 3, is provided for transmitting a supply current from the telephone station; thus each peripheral apparatus may have an external supply; this supply may be effected either by means not shown further, electric batteries and the like, provided in the telephone station of by a line current which is recovered by said regulator arrangement (RCC) as shown, from the energy available on the telephone line. This supply is more specifically interesting for protecting data stored in a random-access memory, RAM of a peripheral apparatus.

According to the invention, when said telepone station (FIG. 3) comprises inter alia a loop-opening device (DOB) for opening the loop under the control of a control signal and on the other hand said 2-wire/4-wire converter has inter alia a muting signal control input for disabling the audio input (E) of the 2-wire/4-wire converter, said bus comprises inter alia two additional conductors for transmitting, coming from at least one peripheral apparatus, a first control signal (NUM-IN) for controlling said loop-opening device (DOB) and a second control signal, denoted the external muting signal (MUT-IN), for controlling said muting signal control input of the 2-wire/4-wire converter (C24), respectively.

Thus, with a peripheral apparatus comprising a dialling circuit for generating a dialling control signal by opening the loop, it is possible to realize an automatic call system such as, for example, an alarm call system for elderly people; actually the connecting bus makes it possible for a peripheral apparatus to effect under the control of a simple push-button for an emergency call, (a) line seizure via (PDL), (b) the automatic calling of a pre-stored number via (NUM-IN MUT-IN), (c) sending a pre-stored SOS message via the conductor (SAE); the operations a, b, c being controlled and checked by an automatic device, for example a micro-programmed automat, of the peripheral apparatus for an alarm call.

The greater part of the time, but this is not absolutely necessary, the peripheal apparatus will adjust the muting signal conductor (MUT-IN) to the active state during the overall period of time necessary for dialling (NUM-IN).

Figure 4:
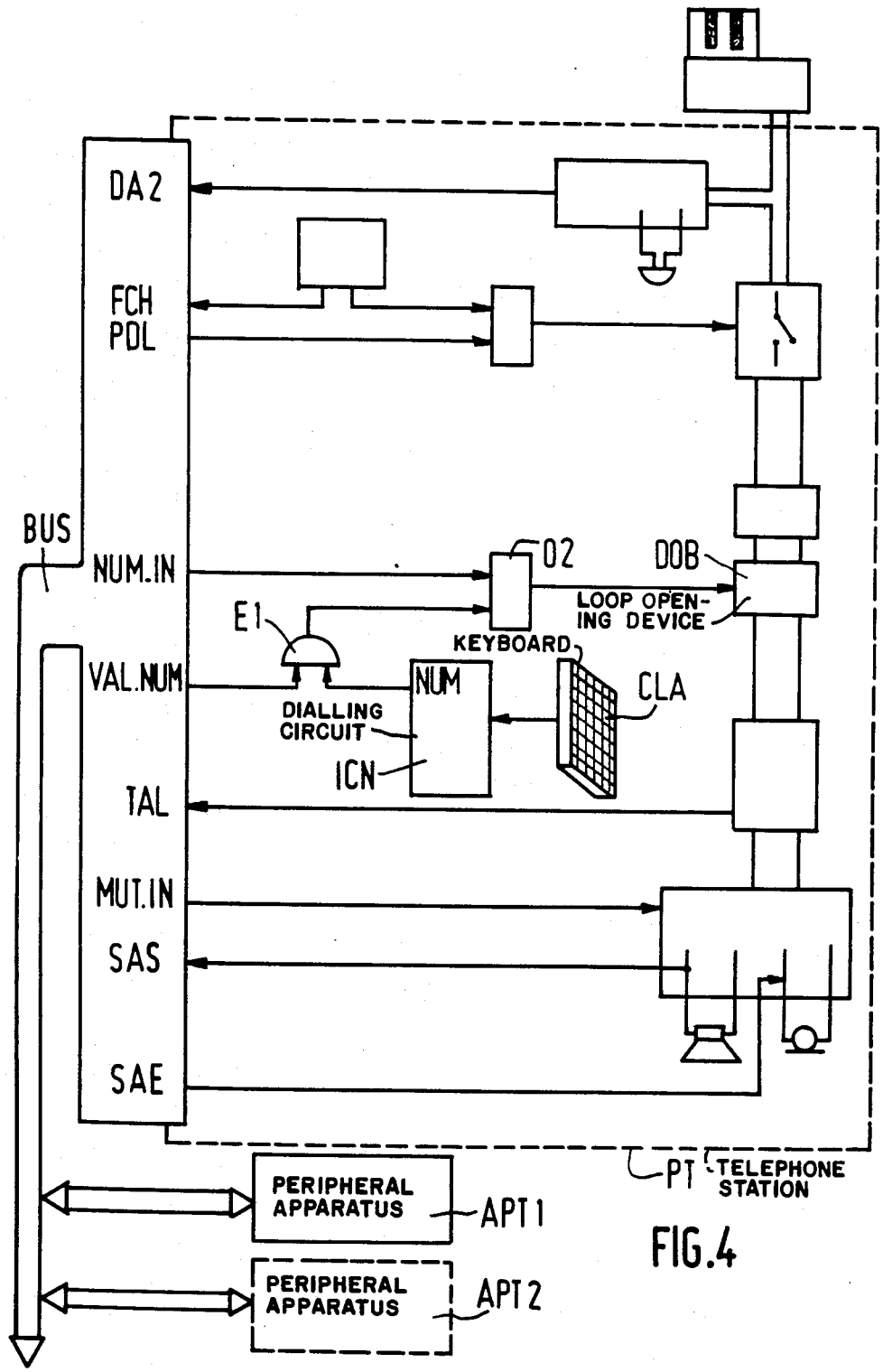
FIG. 4 shows further conductors of the bus.

When the telephone station itself comprises a dialling circuit (ICN), FIG. 4, with a dial or a keyboard (CLA), the dialling circuit (ICN) generates in known manner an internal loop-opening control signal (NUM); in this case, to prevent simultaneous dialling operations, it is necesssary to provide in accordance with the invention an additional conductor (VAL-NUM) to transmit to the bus, supplied by at least one peripheral apparatus, a control signal for disabling the internal loop-opening control signal (NUM), thus, when the signal (VAL- NUM) is active, the AND-gate (E1) prevents the internal dialling signal (NUM) from reaching the OR-gate circuit (02) which transmits to the loop-opening arrangement (DOP) either the external control signal (NUM-IM) or the internal control signal (NUM) when the latter is not disabled by the signal (VAL-NUM) via the AND-gate (E1).

Thus, a peripheral apparatus connected to said bus and comprising a, for example microprogrammed, checking automat, can effect a dialling operation by opening the loop by activating on the one hand the conductor (NUM-IN) and on the other hand the conductor (VAL-NUM) to ensure that no other dialling operation is effected simultaneously from the telephone station. Of course, the peripheral apparatus must, as mentioned above, have previously effected the line seizure (PDL) and all the other desired functional operations which are more specifically rendered possible with the aid of the signals transmitted via the bus in accordance with the invention.

Figure 5:
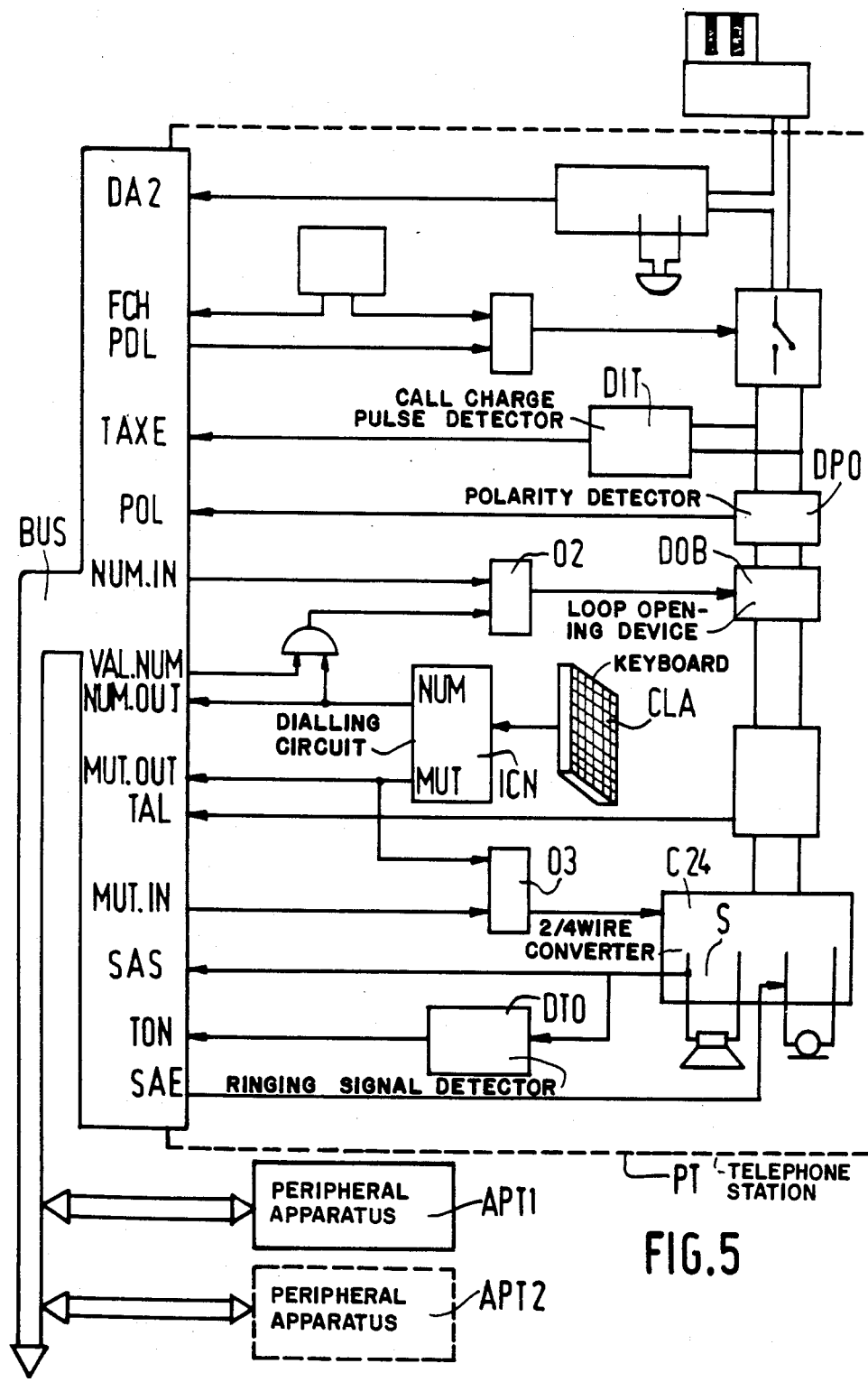
FIG. 5 shows all the conductors of the bus.

According to the invention, it is moreover interesting for some applications of the multi-wire bus system to provide an additional conductor (NUM-OUT), FIG. 5, for transmitting from the telephone station said loop-opening control signal (NUM), which is generated by the internal dialling circuit (ICN).

Thus, a peripheral apparatus connected to the bus will be capable of noting, for example for recording purposes, the numbers which are called by either the telephone station (NUM-OUT) or by any peripheral apparatus (NUM-IN).

In FIG. 5 the conductor (NUM-OUT) is connected to the output (NUM) of the internal dialling circuit (ICN), which is a preferred embodiment.

It is possible to connect this conductor in a different way, not shown, for example to the input of the loop-opening device (DOB); if necessary, the differentiation between the internal and external dialling operations can be realized by ovserving, for example, the position of the signal (VAL-NUM) or the position of the signal (NUM-IN) since in that case, if (NUM-IN)=(NUM-OUT) an external dialling operation is involved.

According to the invention, when the internal dialling circuit (ICN) has an output (MUT), FIG. 5, for the internal muting control signal, there are provided on the one hand an additional conductor (MUT-OUT) for transmitting from the telephone station, said internal muting control signal, and on the other hand an OR-gate circuit (O3) whose output is connected to the muting control input of the 2-wire/4-wire converter (C24) and whose first input is connected to that conductor of the bus which transmits said external muting control signal (MUT-IN) and whose second input is connected to said internal muting control signal conductor (MUT).

The muting arrangement is thus controlled by either the internal dialling ciruit (ICN), or by a control signal (MUT-IN) coming from a peripheral apparatus; any peripheral apparatus can, for example, comprise means for delaying a line seizure control (PDL) and/or dialling control (NUM-IN) when the conductor (MUT-OUT) is active.

Figure 6:
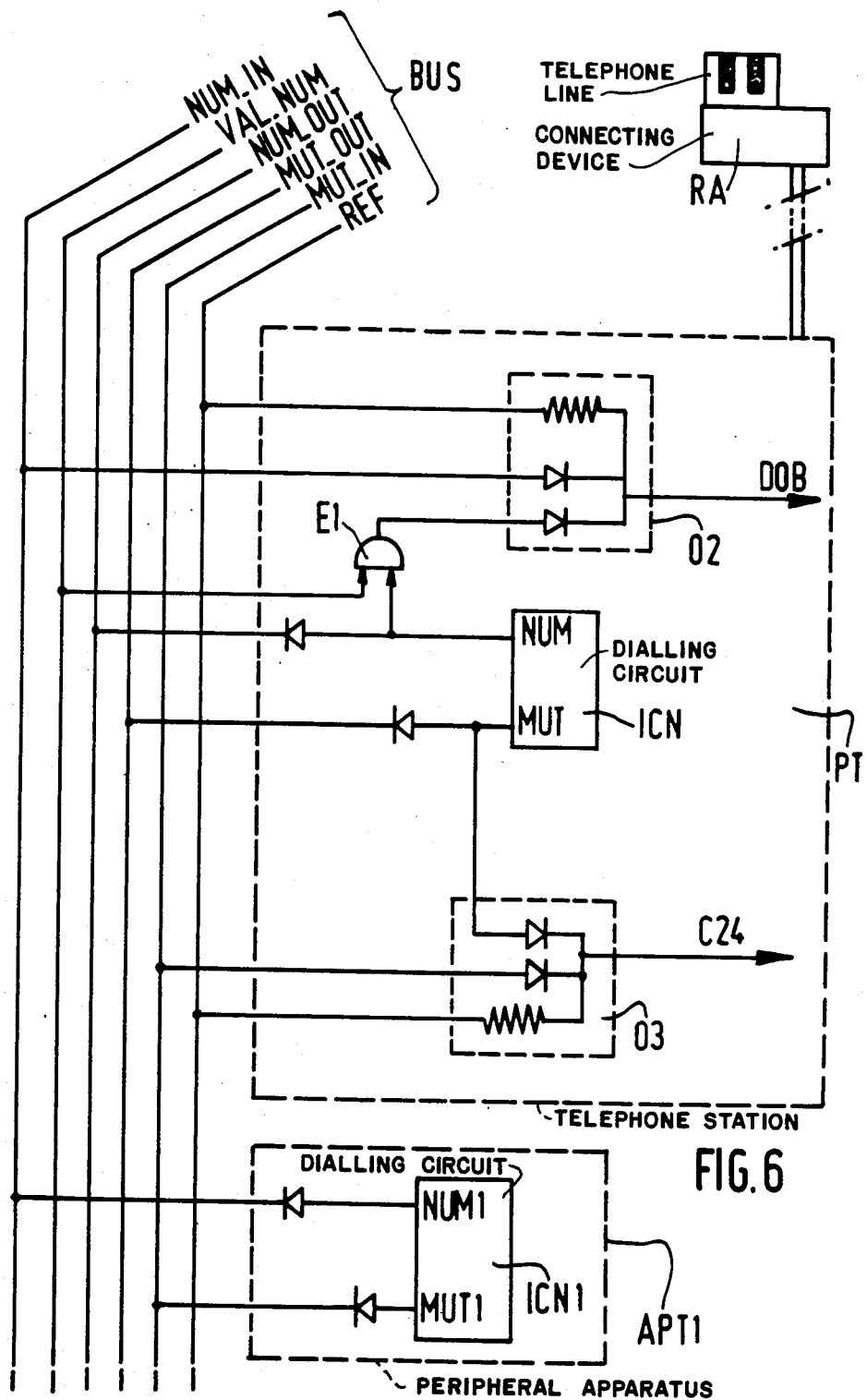
FIG. 6 shows an electrical connection mode.

FIG. 6 shows by way of non-limitative example, as does also FIG. 2, an example of the mode of connecting the elements already shown in FIG. 5, and which have been given the same reference numerals, for the telephone station (PT) and also the elements, which will be described hereinafter, of a peripheral apparatus (APT1) with its own dialling circuit (ICN1) for transmitting a dialling signal (NUM1) to the conductor (NUM-IN) of the bus and for transmitting an external muting control signal (NUT1) to the conductor (MUT-IN) of the bus; some resistors and protection diodes which have not been given a reference numberal but are shown in accordance with normal practice, are shown by way of guidance and nonlimitatively.

For a peripheral apparatus, which effects for example a line seizure control, it is of interest to receive an "acknowledgement of receipt" of this request; to this end an additional conductor (TON), FIG. 5, is provided for transmitting from the telephone station a signal indicating detection or non-detection or a ringing signal coming from a ringing signal detector (DTO) connected to the output (S) of the 2-wire/4-wire converter (C24); a ringing signal detector is an apparatus which responds in known manner to the conventional ringing frequency, which is a continuous sound, that is to say without breaks, having a frequency of 440 Hz in accordance with the customary standards.

It is also of interest to provide an additional conductor (TAXE) in the bus for transmitting, from the telephone station, a call charge signal which is possible when the peripheral apparatus comprises a known call charge pulse detector (DIT) for generating a metering signal.

It is also advantageous, when the telephone station comprises a known detector (DPO) for detecting the polarity of the telephone line for generating a polarity signal, to provide an additional conductor (POL) for transmitting said polarity signal from the telephone station.

The above description refers only to the conventional dialling system with loop opening; a novel dialling system with multiple audio frequencies, often denoted as DTMF, is now coming into usage or becomes suitable for use for telephony. It is of course possible, by a simple conversion of the relative bus conductors to follow this technical evolution which moreover has novel remote control possibilities since the dialling keys can then not only be used for dialling a subscriber's number, but also during a telephone conversation for transmitting, for example, encoded messages which are specially adapted to remote control purposes.

For a person skilled in the art it will be easy to conceive numerous applications of multi-wire buses rendered possible by the connecting means according to the present invention.

What is claimed is:

1. A peripheral telephone system comprising a telephone station for connection to a subscriber line loop, at least one peripheral apparatus, and means connecting said telephone station and said peripheral apparatus for transmitting signals respectively corresponding to respective functional operating conditions of the system, said connecting means being in the form of a bus comprising a plurality of conductors respectively corresponding to respective functional operating conditions of the system and each of such functional operating conditions being signified by signals transmitted only over the particular one of said condutors corresponding thereto; characterized in that: said telephone station comprises
    a device for connecting said telephone station to the telephone line loop,
    a call detector for generating a call detection signal when a call comes in from said telephone line loop, a two-state energizing arrangement, having an active state and an inactive state, a two-state internal control device for controlling said energizing arrangement, said control device having an off-hook state for causing said energizing device to assume its active state and an on-hook state for causing said energizing device to assume its inactive state, a current regulating arrangement for regulating the current circulating in said telephone line loop when the energizing arrangement is in the active state.

and a 2-wire/4-wire converter which, when the input thereof is activated by a microprocessor, sends an audio signal over said telephone line loop, and the output of which energizes an earphone or loudspeaker in response to an audio signal received from said telephone line loop;

and said bus comprises at least six conductors a first conductor for transmitting a reference signal which is common to all peripheral apparatuses connected to said bus, a second condutor for transmitting from the telephone station a signal indicating the state, either off-hook or on-hook, of said two-state internal control device, a third conductor for transmitting from the telephone station to said peripheral apparatus an audio signal coming from said telephone line loop, a fourth conductor for transmitting said call detection signal from the telepone station to said peripheral apparatus, a fifth conductor for transmitting to said telephone station an external line seizure control signal received from said peripheral apparatus and a sixth conductor for transmitting to said telephone station an analog input signal received from said peripheral apparatus.

2. A peripheral telephone system as claimed in claim 1, characterized in that said telephone station further comprises a first OR-gate circuit having an output which controls said energizing arrangement, a first input connected to said two-state internal control device and a second input connected to said fifth conductor of said bus for receiving said external line seizure control signal, said first OR-gate circuit energizing the energizing arrangement depending on the origin, internal and/or external, of the line seizure control signal.

3. A peripheral telephone system as claimed in claim 1, characterized in that the bus comprises a conductor for transmitting a supply current from the telephone station.

4. A peripheral telephone system as claimed in claim 1 in which said telephone station comprises a loop opening arrangement for opening the telephone line loop under the control of a control signal, and said 2-wire/4-wire converter has a muting control input, characterized in that said bus comprises two additional conductors for transmitting a first control signal received from said peripheral apparatus for controlling said loop-opening arrangement and a second external muting control signal for controlling muting of said 2-wire/4-wire converter.

5. A peripheral telephone system as claimed in claim 4 in which the telephone station comprises a circuit for generating a control signal for the loop-opening arrangement, characterized in that said bus comprises an additional conductor for transmitting a disabling control signal received from said peripheral apparatus to said control signal generating circuit; and in that said telephone station further comprises a second OR-gate circuit having an output which controls the loop opening arrangement, a first input connected to said conductor of the bus which carries a loop opening control signal received from said peripheral apparatus, and a second input connected to the output of an AND-gate circuit, and AND-gate circuit having a first input connected to the conductor of the bus carrying the disabling control signal and a second input connected to said conductor which carries said loop-opening control signal.

6. A peripheral telephone system as claimed in claim 5, characterized in that said control signal generating circuit also generates an internal muting control signal; said peripheral apparatus generates an external muting control signal; said bus comprises an additional conductor for transmitting the internal muting control signal from the telephone station; and said telephone station further comprises a third OR-gate circuit having an output connected to a muting control input of said 2-wire/4-wire converter, a first input connected to the conductor of the bus transmitting the external muting control signal, and a second input connected to said control signal generating circuit for receiving the internal muting control signal therefrom.

7. A peripheal telephone system as claimed in claim 1, in which said telephone station further comprises a ringing detector connected to the output of said 2-wire/4-wire converter for producing a ringing detection signal, and said bus further comprises an additional conductor for transmitting the ringing detection signal from the telephone station.

8. A peripheral telephone system as claimed in claim 1, in which said telephone station further comprises a call charging pulse detector for generating a metering signal, and said bus comprises a conductor for transmitting said metering signal from the telephone station.

9. A peripheral telephone system as claimed in claim 1, in which said telephone station further comprises a telephone line polarity detector for generating a polarity signal, and said bus comprises an additional conductor for transmitting said polarity signal from the telephone station.

10. A peripheral telephone system as claimed claim 1, in which said peripheral apparatus is connected to said bus by connectors having a number of pins at least equal to the number of conductors of said bus.

* * * * *

UNITED STATES PATENT AND TRADEMARK OFFICE
CERTIFICATE OF CORRECTION

PATENT NO. : 4,685,121

DATED : August 4, 1987

INVENTOR(S) : Jean-Francois Sanglier

It is certified that error appears in the above-identified patent and that said Letters Patent is hereby corrected as shown below:

Column 10, line 17, claim 5, cancel "and"; insert --said--.

Signed and Sealed this

Sixteenth Day of May, 1989

Attest:

Attesting Officer

DONALD J. QUIGG

Commissioner of Patents and Trademarks